United States Patent
Baumann et al.

(10) Patent No.: US 6,810,166 B2
(45) Date of Patent: Oct. 26, 2004

(54) OPTICAL WAVEGUIDE SWITCH

(75) Inventors: Frieder H. Baumann, Red Bank, NJ (US); Howard R. Stuart, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 148 days.

(21) Appl. No.: 10/299,132

(22) Filed: Nov. 19, 2002

(65) Prior Publication Data

US 2004/0096146 A1 May 20, 2004

(51) Int. Cl.$^7$ .............................. G02B 6/26; G02B 6/35
(52) U.S. Cl. ........................................ 385/22; 359/128
(58) Field of Search ............................. 385/14, 15, 16, 385/17, 18, 20, 24, 31, 37, 39, 128; 359/128; 257/532; 438/619

(56) References Cited

U.S. PATENT DOCUMENTS

| | | | |
|---|---|---|---|
| 6,487,334 B2 * | 11/2002 | Ducellier et al. | 385/22 |
| 6,522,800 B2 * | 2/2003 | Lucero | 385/16 |
| 6,600,849 B2 * | 7/2003 | Ducellier et al. | 385/17 |
| 2002/0076136 A1 * | 6/2002 | Ducellier et al. | 385/17 |
| 2002/0090169 A1 * | 7/2002 | Ducellier et al. | 385/18 |
| 2002/0141687 A1 * | 10/2002 | Iyer et al. | 385/16 |
| 2002/0171121 A1 * | 11/2002 | Ozgur | 257/532 |
| 2004/0097066 A1 * | 5/2004 | Ozgur | 438/619 |

OTHER PUBLICATIONS

"Planar Microoptomechanical Waveguide Switches" by Thor Bakke et al., IEEE Journal on Selected Topics in Quantum Electronics, vol. 8, No. 1, Jan./Feb. 2002, pp. 64–72.

* cited by examiner

*Primary Examiner*—Akm Enayet Ullah

(57) ABSTRACT

A MEMS optical switch includes a movable cantilevered beam with a waveguide corresponding to one port of the switch. The beam is designed for in-plane motion and can be deflected, e.g., using a three-electrode motion actuator having one electrode on each side of the beam, which itself acts as the third electrode. The beam moves toward a side electrode in response to a voltage difference applied between the beam and that electrode. The beam has two terminal positions, each defined by a stopper. At each terminal position, a bumper portion of the beam is pushed against a corresponding stopper, which aligns the waveguide in the beam with one of two stationary waveguides, each corresponding to a port of the switch. The MEMS switch may be fabricated using a single silicon-on-insulator (SOI) wafer.

21 Claims, 8 Drawing Sheets

OPTICAL WAVEGUIDE SWITCH

BACKGROUND OF THE INVENTION

1. Field of the Invention

The invention relates to optical communication equipment and, more specifically, to micro-electromechanical system (MEMS) devices for use in such equipment.

2. Description of the Related Art

Optical communication systems often employ optical waveguide devices that use optical waveguides to confine and direct light and to process optical signals. A representative waveguide device may be an optical cross-connect, a router, a modulator, etc. Waveguide devices often include 1×N optical switches, one species of which is a 1×2 switch. A 1×2 switch receives a single input and directs it to one of two outputs.

A 1×2 waveguide switch may be implemented using a Mach-Zehnder interferometer. In such a switch, an optical signal can be directed to one of two output ports by changing the relative phase shift ($\phi$) in two interferometer arms. For example, when $\phi=0$, signals from the two arms interfere constructively at the first output port and destructively at the second output port. Similarly, when $\phi=\pi$, the signals interfere constructively at the second output port and destructively at the first output port. Therefore, changing the phase shift from 0 to $\pi$ causes the switch to redirect an input optical signal from one output port to the other. The phase shift is typically controlled thermally, e.g., by elevating the temperature of one arm with respect to the other arm. A temperature change induces an index of refraction change, which produces a phase shift.

One problem with a thermo-optic Mach-Zehnder switch is that, because of the required heating/cooling of interferometer arms, switching speed may be relatively low. Another problem is that thermal actuation entails power consumption, which might become substantial in devices having a relatively large number of switches. In addition, thermo-optic Mach-Zehnder switches require careful temperature control, e.g., to reduce thermal drift, which affects signal extinction at the "off" output port and may result in inter-port crosstalk.

SUMMARY OF THE INVENTION

The problems in the prior art are addressed in accordance with the principles of the invention by a MEMS switch. A switch of the invention includes a movable cantilevered beam that has a bumper portion and a waveguide corresponding to one port of the switch. The beam is designed for in-plane motion and can be deflected, e.g., using a three-electrode motion actuator having one electrode on each side of the beam, which itself acts as the third electrode. The beam moves toward a side electrode in response to a voltage difference applied between the beam and that electrode. The beam has two terminal positions, each defined by a stopper. At each terminal position, the bumper portion of the beam is pushed against a corresponding stopper, which aligns the waveguide in the beam with one of two stationary waveguides, each corresponding to a port of the switch. The MEMS switch can be configured to operate as a 1×2 switch with light from a single input port being routed to one of two output ports, or as a 2×1 switch with light from one of two input ports being routed to a single output port. A switch of the invention may be fabricated using a single silicon-on-insulator (SOI) wafer.

According to one embodiment, the invention is a MEMS device, comprising: (A) a stationary part having at least first and second waveguides and at least a first electrode; and (B) a movable cantilevered beam attached at one end to the stationary part, wherein: the shape of the beam defines a third waveguide; and the beam is adapted to bend in response to a voltage difference selectively applied between the beam and the first electrode to align the third waveguide with either the first waveguide or the second waveguide.

According to another embodiment, the invention is a method of operating a MEMS device having at least first, second, and third waveguides, the method comprising selectively applying a voltage difference between a movable cantilevered beam and a first electrode of the MEMS device to align the third waveguide with either the first waveguide or the second waveguide, wherein the MEMS device comprises: a stationary part having at least the first and second waveguides and at least the first electrode; and the movable cantilevered beam attached at one end to the stationary part, wherein: the shape of the beam defines the third waveguide; and the beam bends when the voltage difference is applied between the beam and the first electrode.

According to yet another embodiment, the invention is a method of fabricating a MEMS device, comprising: forming a stationary part having at least first and second waveguides and at least a first electrode; and forming a movable cantilevered beam attached at one end to the stationary part, wherein: the shape of the beam defines a third waveguide; and the beam is adapted to bend in response to a voltage difference selectively applied between the beam and the first electrode to align the third waveguide with either the first waveguide or the second waveguide.

BRIEF DESCRIPTION OF THE DRAWINGS

Other aspects, features, and benefits of the invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
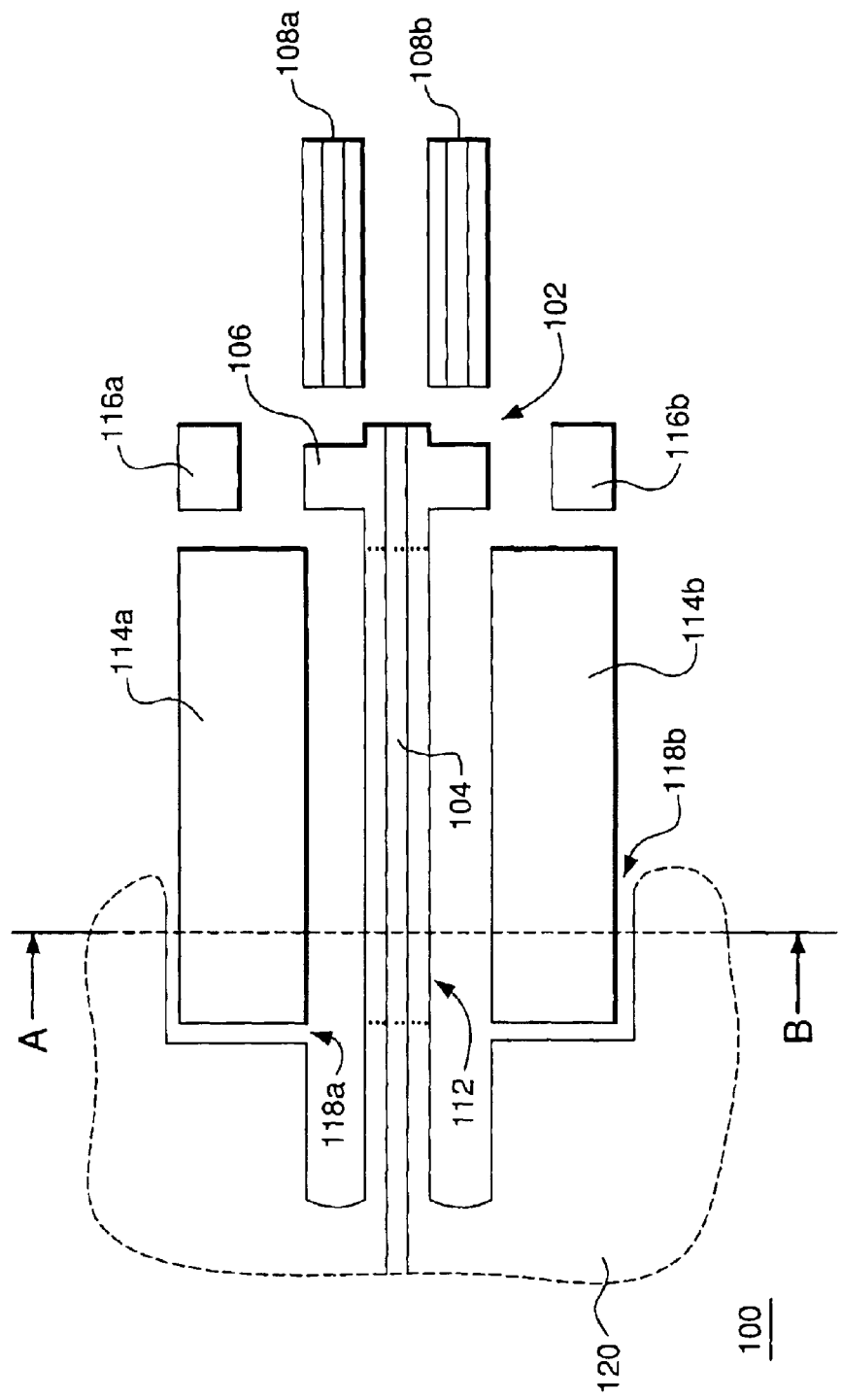
FIGS. 1A–B show top and cross-sectional views of an optical waveguide switch according to one embodiment of the invention.
Figure 1B:
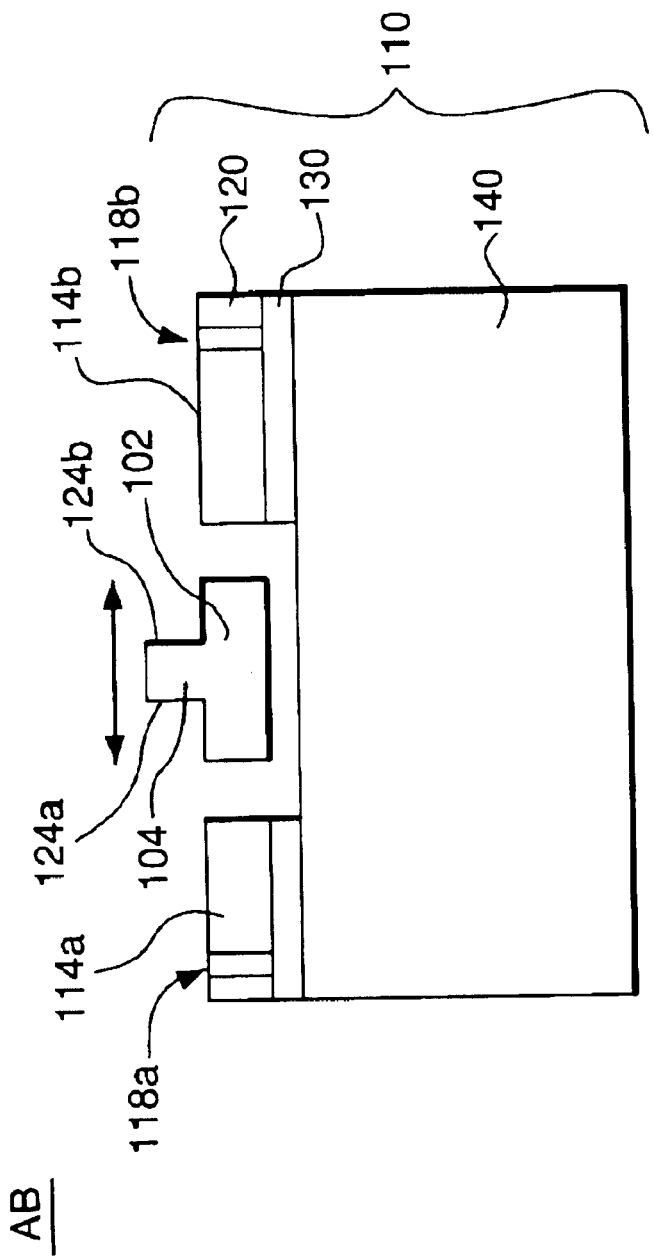

FIGS. 1A–B show top and cross-sectional views, respectively, of an optical waveguide switch 100 according to one embodiment of the invention. Switch 100 has a movable beam 102 formed in an overlayer 120 of a wafer 110 using, e.g., reactive etching. Wafer 110 has two additional layers: a substrate layer 140 and a thin insulating layer 130, which electrically isolates overlayer 120 from substrate layer 140. In one implementation, wafer 110 is a silicon-on-insulator (SOI) wafer, in which overlayer 120 and substrate layer 140 are silicon, and insulating layer 130 is silicon oxide.

Beam 102 is a cantilevered beam, one end of which (e.g., the left end in FIG. 1A) is attached to the rest of overlayer 120 and/or to layer 130. The other end of beam 102 is suspended above layer 140 and can move within the plane of overlayer 120 as indicated by the bidirectional arrow in FIG. 1B. Portions of layers 120 and 130 corresponding to the in-plane trajectory of beam 102 are removed (e.g., by reactive etching) to permit such motion. Two ridges 124a–b in beam 102 define a planar waveguide 104, the cross-section of which is shown in FIG. 1B. In a preferred implementation, waveguide 104 is a single-mode waveguide.

Referring to FIG. 1A, switch 100 also includes two stationary waveguides 108a–b. In one embodiment, each of waveguides 108a–b is similar to waveguide 104 and is defined by the corresponding ridges in overlayer 120 of wafer 110. Waveguide 104 can be aligned with either one of waveguides 108a–b by appropriately deflecting beam 102. As shown in FIG. 1A, beam 102 has a bumper portion 106 that is shaped like a two-headed hammer. When beam 102 is deflected, portion 106 moves between two terminal positions defined by stoppers 116a–b. The size and shape of portion 106 and position of each stopper 116 are preferably such that waveguide 104 aligns with waveguide 108a when portion 106 touches stopper 116a, and with waveguide 108b when portion 106 touches stopper 116b.

When two waveguides are aligned, the light from one waveguide exits into the gap between the two waveguides and then couples into the other waveguide. In preferred embodiments, in an aligned position, the width of the gap between the tips of waveguides 104 and 108 is approximately equal to an integer multiple of $\lambda/2$, where $\lambda$ is the wavelength of light. Such a width reduces coupling loss between waveguides. More details on how the coupling loss can be controlled are presented below.

Switch 100 further comprises a motion actuator, having a movable portion connected to or forming part of beam 102 and a stationary portion. In one embodiment (illustrated in FIG. 1), the movable portion includes a section 112 (located between the dotted lines in FIG. 1A) of beam 102, and the stationary portion includes two electrodes 114a–b formed in overlayer 120. In another embodiment (not shown), the motion actuator includes a comb drive (well known in the art) having four comb-shaped parts, two of which are movable and attached to opposite sides of beam 102, and the other two are stationary comb-shaped electrodes formed in the overlayer. The comb-shaped electrodes are preferably positioned such that the teeth of each pair of movable/stationary comb-shaped parts form an interleaved pattern. In other embodiments, differently shaped actuators may be similarly used.

Each electrode 114 is electrically isolated from the rest of the switch structure using the underlying insulation of layer 130 and a surrounding groove 118 in overlayer 120. In contrast, section 112 is in electrical contact with the rest of overlayer 120. Thus, a voltage differential can be applied between either one of electrodes 114a–b and section 112. In one configuration, layers 120 and 140 are connected to the negative terminal of a voltage source (e.g., ground), while each electrode 114 is connected to a different positive terminal of that voltage source. In preferred embodiments, the voltage source can apply independent voltages to one or both of electrodes 114a–b.

In one configuration, switch 100 may be operated as follows. When the voltage difference between section 112 and electrode 114a is the same as the voltage difference between section 112 and electrode 114b, beam 102 will move to its center position as shown in FIG. 1A. When the voltage difference between section 112 and electrode 114a is greater than that between section 112 and electrode 114b, the total force acting upon beam 102 will be directed toward electrode 114a causing beam 102 to bend and move toward that electrode. At a sufficiently high differential voltage difference, bumper portion 106 pushes against stopper 116a. As a result, beam 102 comes to rest with waveguide 104 aligned with waveguide 108a. When the differential voltage difference is removed, the spring force of beam 102 will return the beam into the center position. Similarly, when a sufficiently high voltage difference is applied between section 112 and electrode 114b, beam 102 bends and moves toward electrode 114b until bumper portion 106 pushes against stopper 116b, thus aligning waveguide 104 with waveguide 108b.

Figure 2:
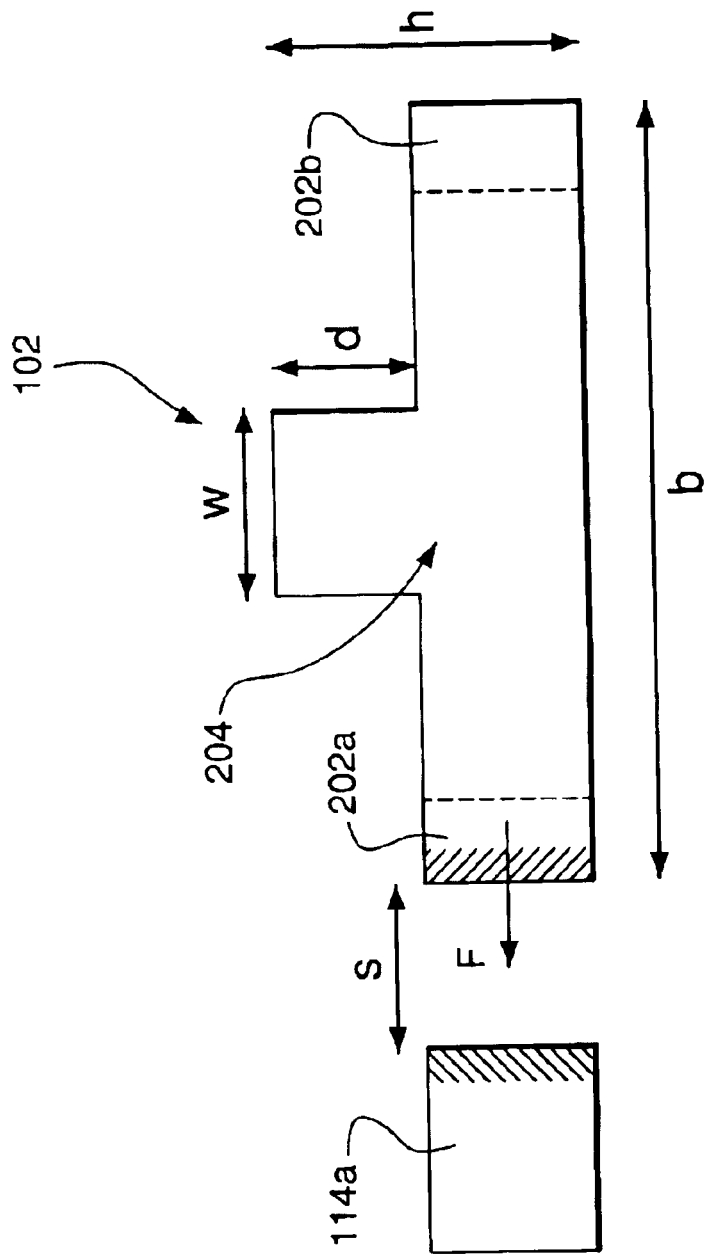
FIG. 2 is an enlarged cross-sectional view of the beam and one actuating electrode of the switch shown in FIG. 1 according to one embodiment of the invention.

FIG. 2 is an enlarged cross-sectional view of beam 102 and electrode 114a according to one embodiment of the invention. Beam 102 has two surface-doped regions 202a–b, one on each side of the beam. Regions 202a–b have an increased dopant concentration compared to that in the rest of beam 102 (and overlayer 120), which correspondingly increases the surface concentration of charge carriers, reduces the depth of the surface depletion layer in those regions, and increases the conductivity of the surface layer. It is known in the art that charge depletion may hinder operation of electrostatic motion actuators. For example, a higher operating voltage will typically have to be used for an otherwise equivalent actuator having a relatively deep depletion layer compared to that for an actuator with a relatively shallow depletion layer. In addition, reduced electrical conductivity associated with depletion layers causes a longer (RC) charging time for a parallel-plate capacitor formed, e.g., by the hatched sides (FIG. 2) of beam 102 and electrode 114a, which correspondingly reduces the switching speed for switch 100. It is preferable, however, to have a relatively low concentration of charge carriers in waveguide portion 204 of beam 102 in order to reduce the free-carrier light absorption in that portion.

In a preferred implementation, portion 204 and regions 202a–b of beam 102 comprise silicon of the same type, e.g., n-type or p-type. However, the dopant concentration in regions 202a–b is higher than that in portion 204. For example, in one implementation, overlayer 120 and beam 102 outside of regions 202a–b comprise n-silicon having a dopant concentration of less than $10^{15}$ cm$^{-3}$, and regions 202a–b comprise n-silicon having a dopant concentration of about $2 \times 10^{17}$ cm$^{-3}$. In one embodiment, each of electrodes 114a–b has a surface-doped region similar to and adjacent to the corresponding region 202.

Referring to FIG. 2, beam 102 has the following dimensions: length l (not shown in FIG. 2), base width b, height h, ridge height d, and waveguide width w; and s is the separation between beam 102 and electrode 114a, whose height is h−d. Given these dimensions, the electrostatic force (F) between section 112 and electrode 114 per unit length can be expressed as follows:

$$\frac{\delta F}{\delta l} = \frac{\varepsilon_0 A(h-d)V^2}{2s^2} \quad (1)$$

where A is a constant taking into account fringe-field effects in the parallel-plate capacitor formed by the highly doped (hatched) sides of beam 102 and electrode 114; V is the voltage difference; and $\varepsilon_0$ is the dielectric permeability constant. When V=0, the value of s is constant along the length of beam 102. However, when V 0, beam 102 deforms and s varies along the length of beam 102, which causes the value of the electrostatic force to vary along the length of beam 102.

Using Equation (1), tip deflection for beam 102 for a particular value of V can be calculated, for example, using the following iterative process. In a first step of the iterative process, an initial approximation for the shape of deformed beam 102 is calculated using: (i) a constant value of the electrostatic force corresponding to the initial separation between beam 102 and electrode 114; (ii) the cross-sectional dimensions of beam 102; (iii) the moment of inertia of beam 102; and (iv) the Young's modulus for the material of beam 102. Since, for each point along beam 102, beam deformation changes the separation between that point and electrode 114, it also changes the electrostatic force at that point. In a next step of the iterative process, (A) for each point along beam 102, a new value for the force is calculated using the separation of that point from electrode 114 obtained in the preceding step and (B) a next approximation for the shape of beam 102 is calculated using the new value for the force. The iterative process continues until, e.g., the difference between the last two approximations becomes less than selected precision, at which point the iterative process is terminated. Tip deflection for beam 102 is then obtained from the shape of beam 102 calculated in the last step.

Figure 3:
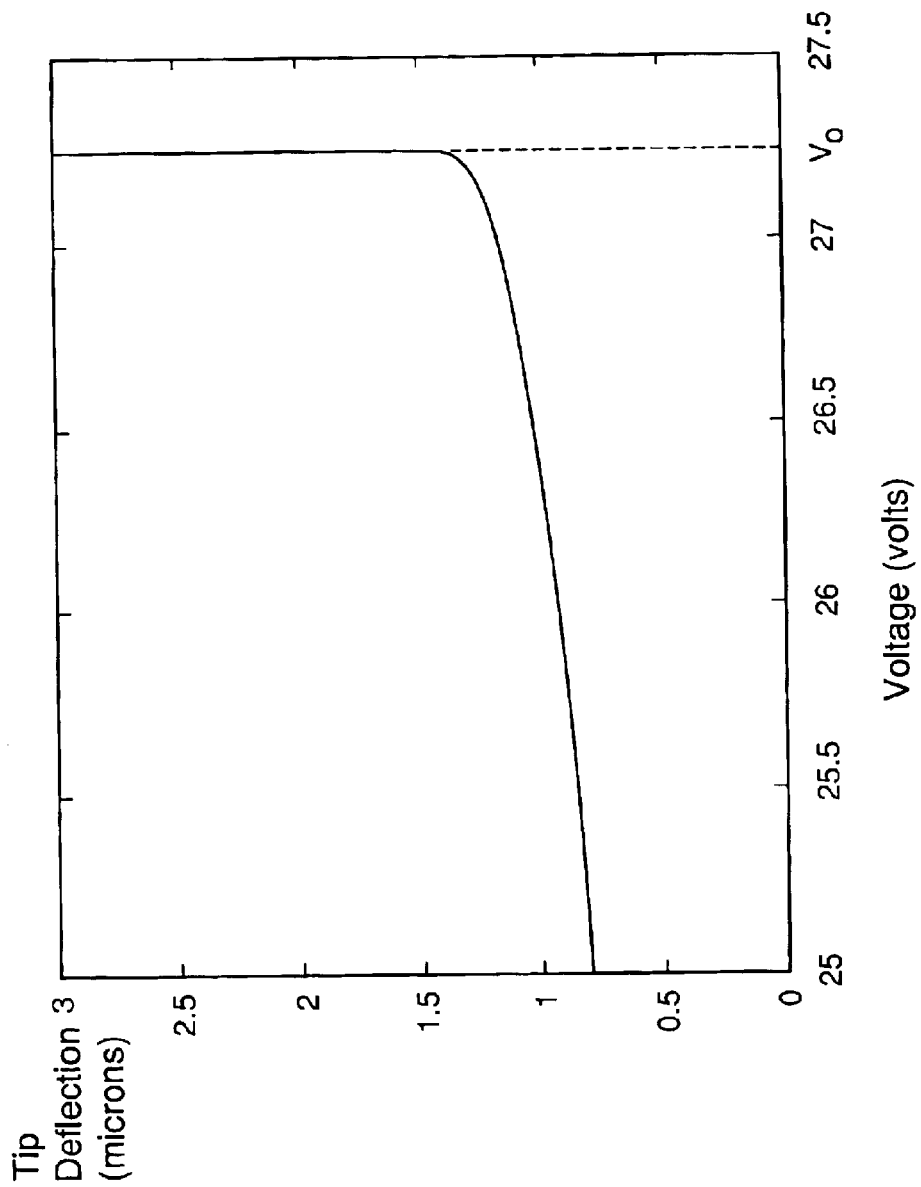
FIG. 3 graphically illustrates tip deflection of one possible implementation of the beam in the switch of FIG. 1 as a function of voltage applied between the beam and an actuating electrode.

FIG. 3 shows a graph representing tip deflection of beam 102 as a function of V calculated as described above for the following beam dimensions: l=250 $\mu$m; b=4 $\mu$m; h=3 $\mu$m; d=1.5 $\mu$m; w=2 $\mu$m; and an initial separation (s$_0$) between beam 102 and electrode 114a of 3 $\mu$m. As shown in FIG. 3, at V=25 volts, the tip is deflected by about 0.75 $\mu$m. The deflection increases gradually until just about V=27.3 volts. At V≧27.3 volts, beam 102 becomes unstable and accelerates toward electrode 114. This phenomenon is well known in the art and is often referred to as "snap-down." However, stopper 116a (FIG. 1) prevents the collapse of beam 102 against electrode 114a and, as explained above, stops the beam at the position where waveguide 104 is aligned with waveguide 108a. Thus, for the above-indicated dimensions of beam 102, applying a voltage difference of 27.3 volts or higher between section 112 and electrode 114a, while electrode 114b is not biased, will turn on the output port of switch 100 corresponding to waveguide 108a and turn off the output port corresponding to waveguide 108b. Similarly, applying a voltage difference of 27.3 volts or higher between section 112 and electrode 114b,while electrode 114a is not biased, will turn on the output port corresponding to waveguide 108b and turn off the output port corresponding to waveguide 108a. Voltage V$_0$ is referred to as the minimum operating voltage of switch 100.

Figure 4:
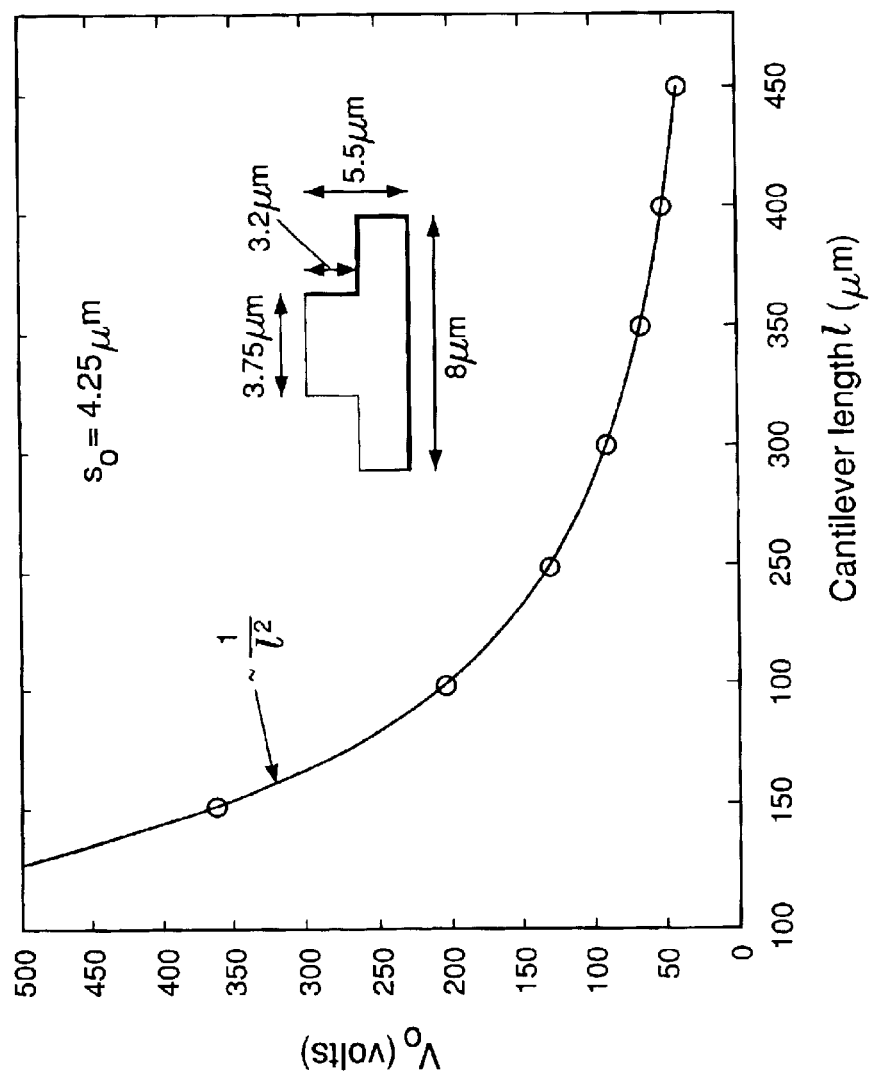
FIG. 4 graphically illustrates the dependence of the minimum operating voltage ($V_0$) on beam length (l) according to other implementations of the beam in the switch of FIG. 1.

FIG. 4 shows a graph representing the dependence of the minimum operating voltage of switch 100 on the length (l) of beam 102 having the cross-sectional dimensions and initial separation from electrode 114 indicated in the inset of FIG. 4. As can be seen, the minimum operating voltage is approximately inversely proportional to the length squared. For example, for l=400 $\mu$m, the minimum voltage is about 50 volts, whereas, for l=200 $\mu$m, the minimum voltage is about 200 volts.

Figure 5:
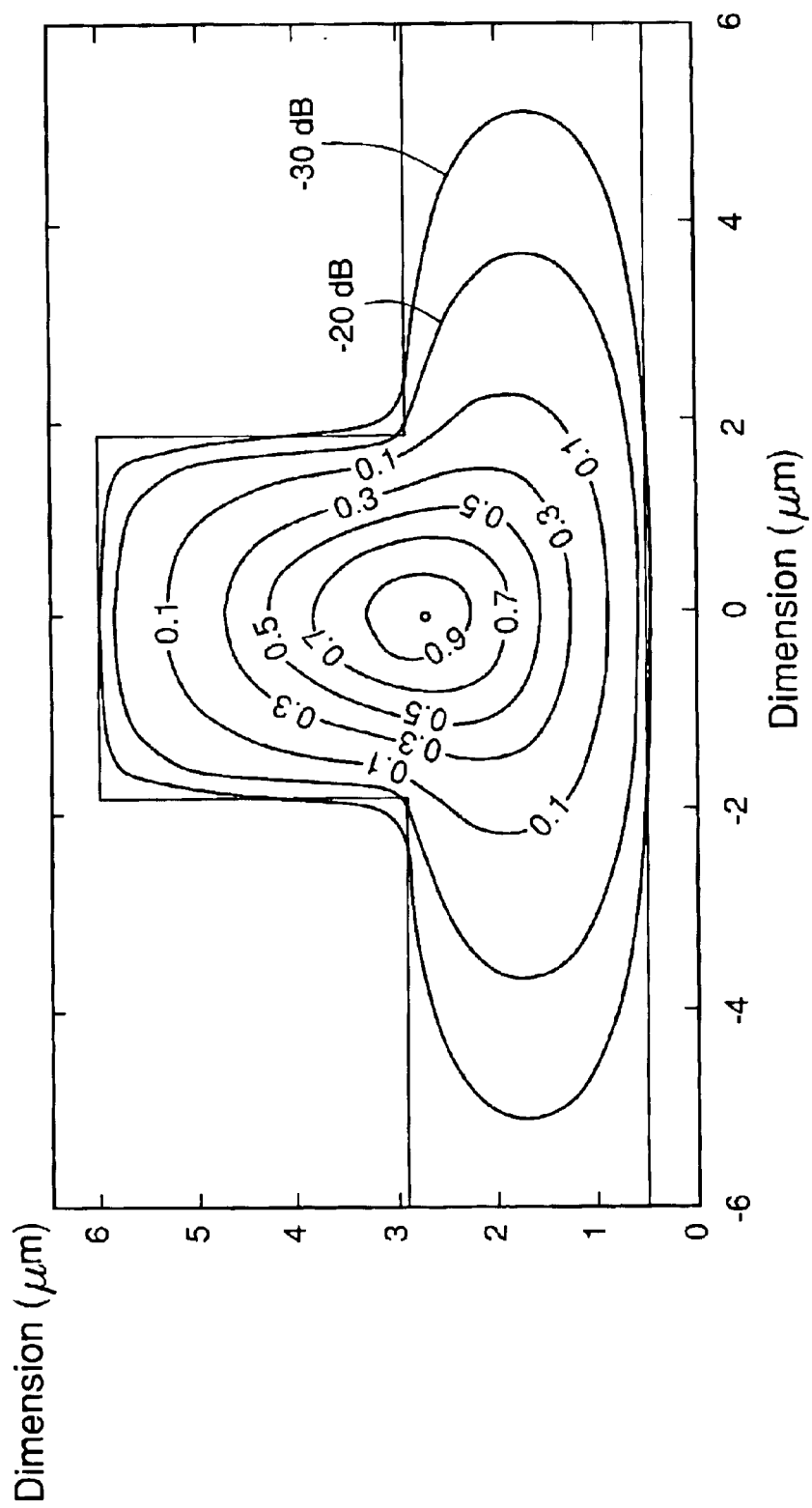
FIG. 5 graphically illustrates light distribution in a waveguide of the switch shown in FIG. 1.

FIG. 5 shows a graph representing an intensity (mode) profile for light ($\lambda$=1550 nm) guided by waveguide 104 of beam 102 having the cross-sectional dimensions indicated in the figure. More specifically, FIG. 5 is a contour plot of a cross-section of beam 102, where the number corresponding to each contour line indicates relative light intensity, where the maximum light intensity at the center point of waveguide 104 is normalized to 1.0. As can be seen in FIG. 5, light is well confined within waveguide 104 of beam 102. In particular, the relative light intensity is only −30 dB at a distance of about 5 $\mu$m from the beam center. Therefore, surface-doped regions 202a–b (FIG. 2) of up to 1 $\mu$m in depth can be implemented as described above without markedly affecting light propagation in waveguide 104 having the mode profile illustrated in FIG. 5.

Figure 6:
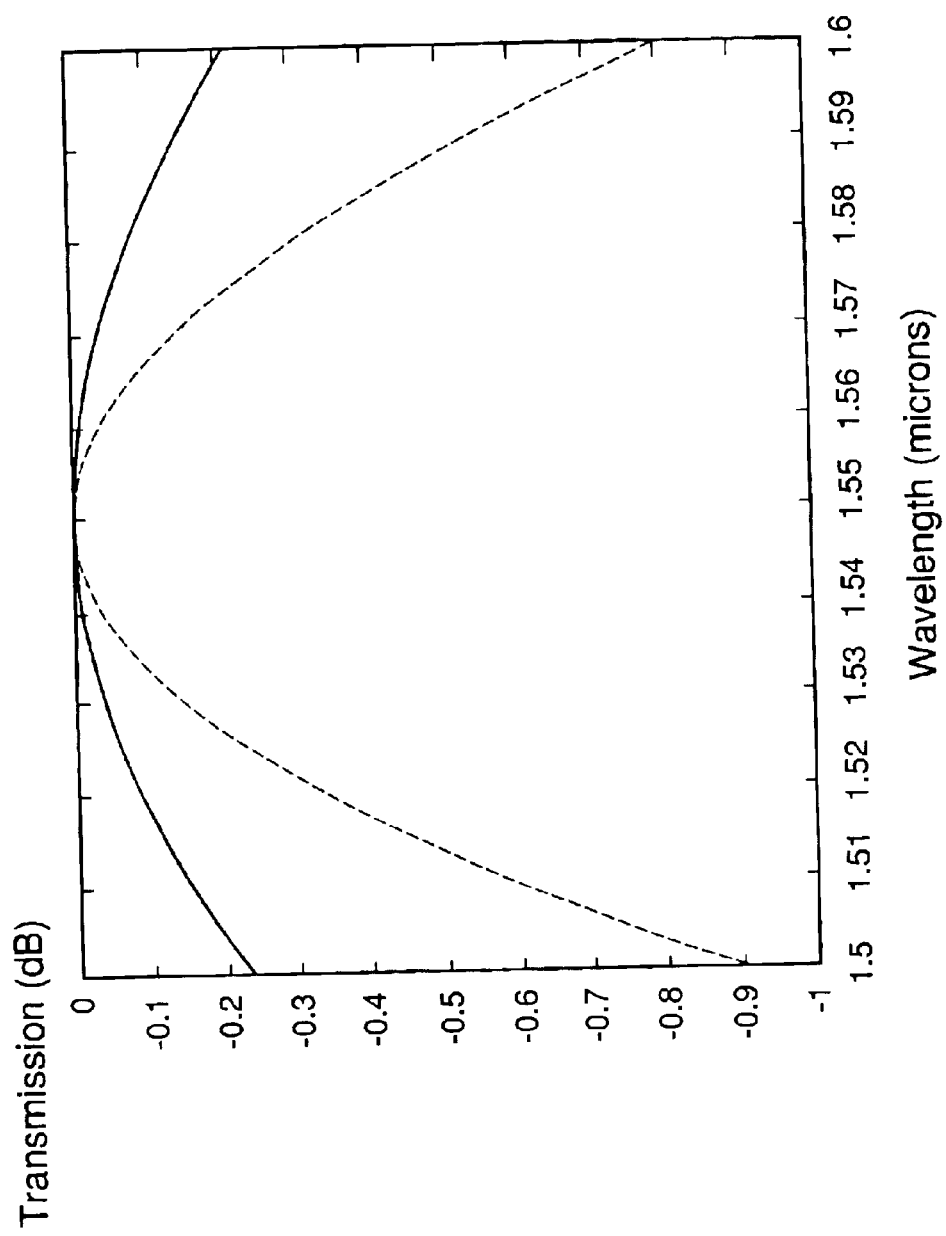
FIG. 6 graphically illustrates light transmission through an air gap between two waveguides in the switch of FIG. 1.

FIG. 6 shows a graph representing, as a function of $\lambda$, light transmission across a silicon-air-silicon gap corresponding to an aligned position of waveguides 104 and 108. More specifically, the curves shown in FIG. 6 are calculated using an approximation of plane-wave illumination, where the solid curve corresponds to a gap size of 0.775 $\mu$m and the dashed curve corresponds to a gap size of 1.550 $\mu$m. Note that actual illumination conditions will result in a small additional loss (e.g., about −0.05 dB) due to edge (non-planarity) effects at the tips of waveguides 104 and 108.

As indicated in FIG. 6, at a center wavelength ($\lambda_0$) of 1550 nm, the transmission loss is close to 0 dB because, for the gap widths (g) illustrated in FIG. 6, the following condition is satisfied:

$$g = n\frac{\lambda_0}{2} \quad (2)$$

where n is an integer. However, as wavelength begins to deviate from $\lambda_0$, the transmission begins to decrease (transmission loss begins to increase) due to reflections at the two silicon/air interfaces. This behavior imposes a bandwidth limit on an optical signal that can be coupled from one waveguide to the other. For example, at the −0.1-dB transmission level, the bandwidth is limited to about 60 nm for the half-wavelength gap (solid curve) and about 30 nm for the whole-wavelength gap.

In a preferred implementation of switch 100, each gap width between waveguides 104 and 108 is designed to be approximately $\lambda_0$/2. In one embodiment, to increase the bandwidth, the tips of beam 102 and waveguides 108a–b are coated with a layer of anti-reflection coating (ARC) as known in the art. For example, using such ARC coating with a whole-wavelength gap may increase the bandwidth from about 30 nm to about 60 nm. In a different embodiment, the tips of beam 102 and waveguides 108a–b are coated with a layer of ARC coating having an appropriate thickness to reduce transmission losses for optical signals having center wavelengths different from $\lambda_0$=2 g/n and thus to adapt switch 100 for use with a relatively wide range of center wavelengths.

Compared to Mach-Zehnder switches of the prior art, switch 100 may provide one or more of the following benefits. Since the mass of beam 102 is relatively low, the beam can be moved relatively easily and quickly between two terminal positions. As a result, the switching speed of switch 100 may be significantly faster than that of a thermo-optic Mach-Zehnder switch. Also, power consumption in switch 100 may be significantly reduced compared to that in a thermo-optic Mach-Zehnder switch. In addition, since switch 100 is essentially an "on-off" switch, it is not sensitive to the effects of drift, including thermal drift.

Different techniques may be used to fabricate switch 100 from an initial SOI wafer. For example, an etch fabrication method may be used. It is known that silicon etches significantly faster than silicon oxide using, e.g., appropriate reactive ion etching (RIE) techniques. Similarly, silicon oxide etches significantly faster than silicon using, e.g., hydrofluoric acid. Various parts of switch 100 may be mapped onto the corresponding layer using lithography. Modern lithographic techniques are capable of defining details whose size is as small as about 0.25 microns. Additional description of various etching steps may be found, for example, in U.S. Pat. Nos. 6,201,631, 5,629,790, and 5,501,893, the teachings of all of which are incorporated herein by reference.

Figure 7A:
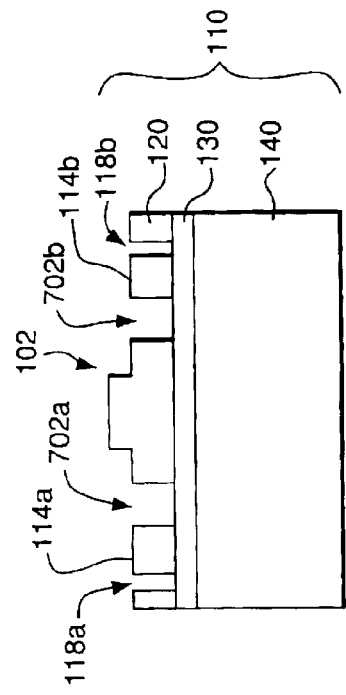
FIGS. 7A–D show a series of cross-sectional views corresponding to different fabrication steps of the switch shown in FIG. 1 according one embodiment of the invention.
Figure 7B:
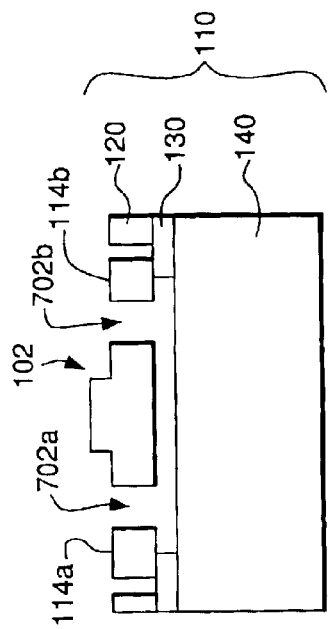
Figure 7C:
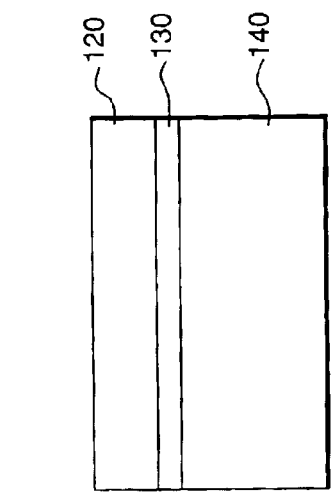
Figure 7D:
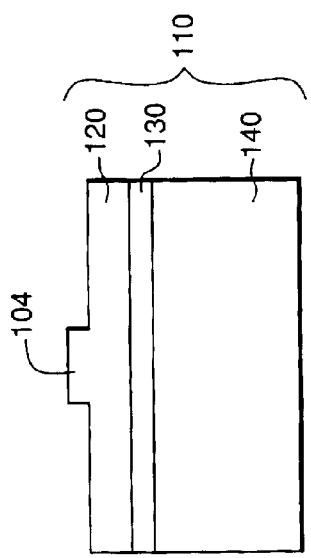

FIGS. 7A–D show a series of cross-sectional views corresponding to different fabrication steps of switch 100 according to one embodiment of the invention. More specifically, FIG. 7A shows SOI wafer 110 prior to fabrication processing. FIG. 7B shows wafer 110 after part of overlayer 120 is removed (e.g., by etching or grinding) to define waveguide 104 and also waveguides 108a–b (not shown in FIG. 7). FIG. 7C shows wafer 110 after beam 102 and electrodes 114a–b are formed, e.g., by etching away portions of overlayer 120 corresponding to openings 702a–b and grooves 118a–b. Surface doping of beam 102 and electrodes 114a–b may then be performed by (i) depositing a layer of doped silicon-oxide glass into openings 702a–b and (ii) annealing wafer 110 at a high temperature to drive the dopant from the glass into the silicon. FIG. 7D shows wafer 110 after the doped glass (if any) deposited into openings 702a–b, the portions of layer 130 corresponding to those openings, and the portion of layer 130 underneath beam 102 are removed to release the beam. During the etching step illustrated by FIG. 7D, when removing the portion of layer 130 underneath beam 102, the etchant will typically undercut electrodes 114a–b by partially removing the portions of layer 130 underneath the electrodes as shown (not to scale) in FIG. 7D. The width of electrodes 114a–b is therefore chosen (by appropriately placing grooves 118a–b) to be greater than the width of beam 102 in order for the electrodes to remain attached to layer 130 after beam 102 is released.

Although fabrication steps for switch 100 were described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. In addition, differently shaped beams, bumpers, stoppers, waveguides, electrodes, and/or motion actuators may be implemented without departing from the scope and principle of the invention.

While this invention has been described with reference to illustrative embodiments, this description is not intended to be construed in a limiting sense. Although switch 100 was described in reference to a center wavelength of 1550 nm, it can similarly be implemented for other suitable center wavelengths. The switch can be configured to operate as a 1×2 switch with one input port and two output ports or, alternatively, as a 2×1 switch with two input ports and one output port. An additional stationary waveguide may be placed between waveguides 108a–b such that waveguide 104 aligns with that additional waveguide when beam 102 is in the center (non-deflected) position, thus implementing a 1×3 (or 3×1) switch. Furthermore, a 1×N (or N×1) switch can be similarly implemented by placing additional stationary waveguides between waveguides 108a–b.

Multiple switches of the invention may be variously arrayed and/or cascaded in a single integrated structure. For example, a 2×1 switch may be combined with a 1×2 switch to implement a 2×2 blocked switch. Such a blocked switch may be designed with a single beam that is fixed at the center and has two movable ends, each end cantilevered between a pair of stationary waveguides. In a different example, an integrated structure may have N 1×2 switches connected in series to implement a 1×(N+1) switch. As is apparent to one skilled in the art, various other switches may be implemented by variously connecting 2×1 and 1×2 switches of the invention.

Although switch 100 was described as having two electrodes and two stoppers, it may also be implemented with just one electrode and one stopper, e.g., electrode 114a and stopper 116a (FIG. 1A). In such an implementation, the position of waveguide 108b is chosen such that waveguide 104 is aligned with the first stationary waveguide when beam 102 is in a center position shown in FIG. 1A, i.e., when electrode 114a is not biased.

Although switch 100 was described as an "on-off digital" device operated such that the first port corresponding to a stationary waveguide is on, while the second such port is off, and vice versa, it may also be operated as an "analog" device. In an analog configuration of switch 100, beam 102 can be held at any desirable position between the two terminal positions, e.g., by applying an appropriate voltage between beam 102 and electrode 114, the voltage having an absolute value less than the snap-down voltage (also see FIG. 3). Switch 100 configured as an analog device can be used, for example, as a variable attenuator. More specifically, desired attenuation for an optical signal in such an attenuator is achieved by applying an appropriate voltage to intentionally misalign waveguide 104 with waveguide 108 by a relatively small amount. Due to the misalignment, an optical signal is attenuated by a desirable amount corresponding to the coupling loss between the waveguides.

Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising:
   (A) a stationary part having at least first and second waveguides and at least a first electrode; and
   (B) a movable cantilevered beam attached at one end to the stationary part, wherein:
      the shape of the beam defines a third waveguide; and
      the beam is adapted to bend in response to a voltage difference selectively applied between the beam and the first electrode to align the third waveguide with either the first waveguide or the second waveguide.

2. The invention of claim 1, wherein, when the beam is not bent, the beam and the first electrode form a parallel-plate capacitor.

3. The invention of claim 1, wherein the MEMS device is formed in a single wafer, the wafer comprising:
a first layer;
a second layer formed over the first layer; and
a third layer formed over the second layer, wherein:
the first electrode, the first and second waveguides, and the beam are formed in the third layer; and
the second layer electrically insulates the first layer from the third layer.

4. The invention of claim 1, wherein the third waveguide is defined by a pair of ridges formed in the beam.

5. The invention of claim 4, wherein the beam is formed from substantially a single material.

6. The invention of claim 4, wherein the height of and separation between the ridges are such that the third waveguide is a single-mode waveguide.

7. The invention of claim 1, wherein the beam has a doped region at a surface adjacent to the first electrode.

8. The invention of claim 1, wherein:
the stationary part further comprises a first stopper;
the beam comprises a bumper portion; and
the third waveguide is aligned with the first waveguide when the bumper portion is in contact with the first stopper.

9. The invention of claim 1, wherein:
the stationary part further comprises a second electrode; and
the beam is adapted to bend in response to a voltage difference applied between the beam and the second electrode, in a direction different from the bending imparted by the voltage difference applied between the beam and the first electrode.

10. The invention of claim 9, wherein:
the stationary part further comprises a first stopper and a second stopper;
the beam comprises a bumper portion;
the third waveguide is aligned with the first waveguide when the bumper portion is in contact with the first stopper; and
the third waveguide is aligned with the second waveguide when the bumper portion is in contact with the second stopper.

11. The invention of claim 1, wherein:
the MEMS device is designed to operate with light having a center wavelength $\lambda$; and
when the third waveguide is aligned with the first waveguide, a gap between the first waveguide and the third waveguide has a width substantially equal to an integer multiple of $\lambda/2$.

12. The invention of claim 1, wherein:
the MEMS device is adapted to operate as a 1×2 optical switch; and
the MEMS device is implemented in an integrated device having two or more such MEMS devices.

13. A method of operating a MEMS device having at least first, second, and third waveguides, the method comprising selectively applying a voltage difference between a movable cantilevered beam and a first electrode of the MEMS device to align the third waveguide with either the first waveguide or the second waveguide, wherein the MEMS device comprises:
a stationary part having at least the first and second waveguides and at least the first electrode; and
the movable cantilevered beam attached at one end to the stationary part, wherein:
the shape of the beam defines the third waveguide; and
the beam bends when the voltage difference is applied between the beam and the first electrode.

14. The invention of claim 13, wherein the magnitude of the voltage difference is greater than a snap-down voltage between the beam and the first electrode.

15. The invention of claim 13, further comprising changing the magnitude of the voltage difference between the beam and the first electrode to change the alignment of the third waveguide relative to the first and second waveguides.

16. The invention of claim 13, further comprising changing the magnitude of the voltage difference between the beam and the first electrode to introduce misalignment between the third waveguide and the first waveguide, wherein the MEMS device is configured as a variable attenuator.

17. A method of fabricating a MEMS device, comprising:
forming a stationary part having at least first and second waveguides and at least a first electrode; and
forming a movable cantilevered beam attached at one end to the stationary part, wherein:
the shape of the beam defines a third waveguide; and
the beam is adapted to bend in response to a voltage difference selectively applied between the beam and the first electrode to align the third waveguide with either the first waveguide or the second waveguide.

18. The invention of claim 17, wherein the MEMS device is formed in a single wafer, the wafer comprising:
a first layer;
a second layer formed over the first layer; and
a third layer formed over the second layer, wherein:
the first electrode, the first and second waveguides, and the beam are formed in the third layer; and
the second layer electrically insulates the first layer from the third layer.

19. The invention of claim 18, wherein the beam is formed by:
forming a pair of ridges in the third layer, the ridges corresponding to a third waveguide;
forming, in the third layer, the first electrode, the first and second waveguides, and the beam having the third waveguide;
removing a portion of the second layer underneath the beam to enable motion of the beam.

20. The invention of claim 17, wherein the beam has a doped region at a surface adjacent to the first electrode.

21. The invention of claim 20, wherein the doped region is formed by:
depositing a layer of doped glass into an opening between the beam and the first electrode; and
annealing the wafer at a high temperature to drive a dopant from the glass into the beam.

* * * * *